May 11, 1926.
H. L. VAN VALKENBURG
LIQUID METERING APPARATUS
Filed June 6, 1924
1,584,051
Fig-1-
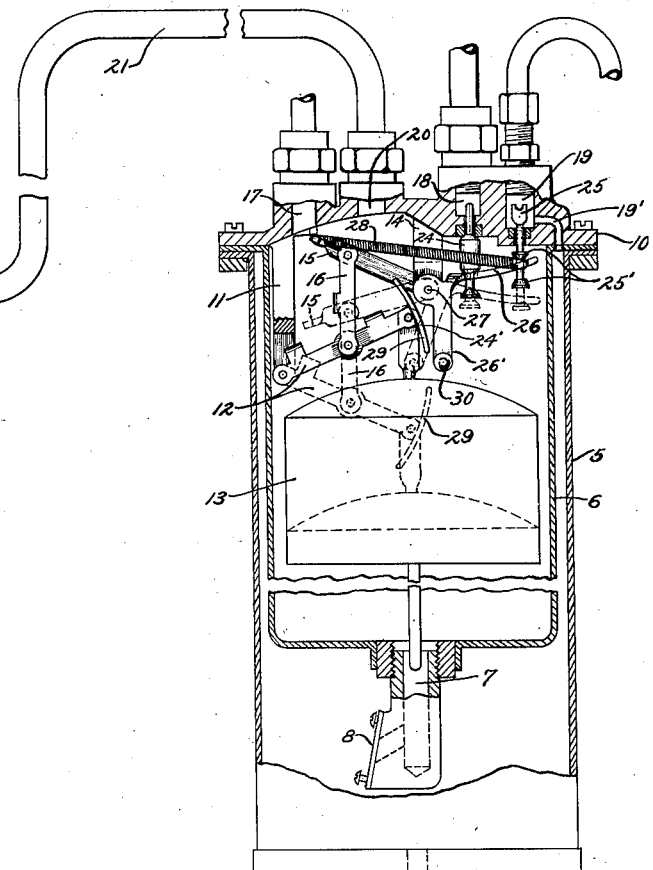
Fig-2-
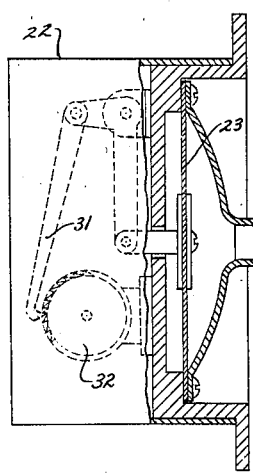
INVENTOR.
Hermon L. Van Valkenburg.
BY
Morsell, Keeney & Morsell,
ATTORNEY.

Patented May 11, 1926.

1,584,051

UNITED STATES PATENT OFFICE.

HERMON L. VAN VALKENBURG, OF MILWAUKEE, WISCONSIN, ASSIGNOR OF ONE-HALF TO WM. M. SWIFT MILLER, OF WAUWATOSA, WISCONSIN.

LIQUID-METERING APPARATUS.

Application filed June 6, 1924. Serial No. 718,251.

This invention relates to improvements in liquid metering apparatus, more particularly adapted for measuring the amount of gasoline supplied to an internal combustion engine.

A further object of the invention is to provide a liquid metering apparatus which is combined with a gasoline feed vacuum system in a manner to positively indicate the amount of gasoline passing through the system.

A further object of the invention is to provide a liquid metering apparatus in which the float of the vacuum system is compelled to positively move the full length of its travel in one direction before it can move in the opposite direction.

A further object of the invention is to provide a liquid metering apparatus which is of simple construction, is strong and durable and is well adapted for the purpose described.

With the above and other objects in view, the invention consists of the improved liquid metering apparatus and its parts and combinations as set forth in the claims and all equivalents thereof.

In the accompanying drawing in which the same reference characters indicate the same parts in all of the views:

Fig. 1 is a side view, partly in section, of the improved metering apparatus shown connected to an indicator, the indicator also being partly in section; and Fig. 2 is a horizontal sectional detail view of a portion of the device.

Referring to the drawing, the numeral 5 indicates a vacuum tank or receptacle which is provided with an inner measuring tank or receptacle 6 suspended from the upper end of the vacuum tank. Said inner tank is formed with a lower outlet opening 7 closed by a check valve 8 to discharge the contents of the inner tank into the outer tank. The outer tank is provided with a discharge tube 9 which leads to the float chamber of the carburetor of the engine (not shown). The cap or top 10 of the tanks is provided with a depending lug 11 to which is pivotally connected a lever arm 12 and from the free end of this arm a float 13 is suspended. The cap 10 is also provided with another depending lug 14 to which is pivotally connected an arm 15. A link 16 is connected medially to the lever arm 12 and the arm 15 to cause said arms to move simultaneously with the movement of the float.

The cap member 10 is provided with a gasoline intake opening 17 for conduit connection with a source of supply, a suction opening 18 for connection with the intake manifold of the engine, an air intake opening 19, and and an indicator opening 20 which is connected by a tube 21 to the indicator 22. The outer tank is also open to the air by port 19'. Said indicator may be of any type desired adapted to be actuated by a diaphragm 23 or any other equivalent device.

The cap openings 18 and 19 are controlled by valves 24 and 25, the manifold opening valve 24 closing with an upward movement and the air inlet valve 25 opening with the same movement. A bell crank lever 26 also pivotally connected to the same pivot pin 27 as the arm 15 is pivoted to, is loosely connected to the stems of said valves and controls the opening and closing thereof. Coiled springs 28 connected to the projecting portions of the arms 15 and 26 and positioned on opposite sides of said arms are adapted to swing the arm 26 upwardly or downwardly with a quick movement when the said springs are swung above or below the axial line of the pivot pin 27 in a manner common to vacuum feed systems. As considerable lost play is provided between the arm 26 and the valve stems by the spaced enlargements 24' and 25', the quick movement mentioned is imparted to said valves. As thus ordinarily constructed there is nothing to positively insure the same tripping action at the end of each movement of the float as it is possible for the vibration of the automobile, of which the system forms a part, to cause the valve arm to trip before the desired amount of gasoline has been received into or is discharged from the inner tank 6. To provide for a fixed amount of gasoline admitted into the inner tank at each upward reciprocation of the float the free end of the lever arm 12 is provided with a segmental flange 29 which is engaged by a pin 30 carried by the lower end of the lower arm 26' of the bell crank lever 26. The said segmental flange 29 passes upwardly on the right hand side of the pin 30 with respect to Fig. 1 when the float moves upwardly and downwardly on the left hand side of the pin when the float moves downwardly. The segmental flange is of such circumferential length as to just pass above or below the lateral arc of movement of the pin 30 in moving the valves to open or closed position. As said flange 29 swings very close to the pin 30 in both movements, the pin and likewise the bell crank lever 26 of which it forms a part, cannot swing in either direction to move the valves to open or closed position until the float has completed its full movement and the exact predetermined amount of gasoline has entered or has been discharged from the inner tank.

In operation the valve 24 when in open position will permit the suction of the engine to create a partial vacuum in the inner tank and this vacuum will cause the diaphragm 23 to move outwardly and the pawl 31 to move downwardly the distance of one tooth. Now as the inner tank is filled to the predetermined extent the lever will be tripped to open the valve to the outside air and close the valve to the intake manifold with the result that the vacuum will be relieved and the gasoline will be discharged through the valved opening 7. Simultaneously with this movement the diaphragm of the indicator will move inwardly to its normal position and pull the pawl 31 upwardly and turn the indicator wheel 32 one teeth and thus indicate the number of times the inner tank has been filled and discharged, and the amount of gasoline supplied to the engine. As the valves cannot be tripped until the inner tank has received its full and exact amount of gasoline, the amount indicated will be practically exact. While the metering apparatus has been shown and described as particularly adapted for use with an internal combustion engine it is to be understood as applicable for other uses without departing from the spirit and scope of the invention.

From the foregoing description it will be seen that the metering apparatus is of very simple construction and is well adapted for the purpose described.

What I claim as my invention is:

1. A liquid metering apparatus, comprising a receptacle having a liquid supply conduit connected thereto, a suction conduit connected to the receptacle, a valve controlling the suction conduit, a float means for actuating the valve, and means for positively preventing the movement of the valve until the receptacle has received its exact amount of liquid.

2. A liquid metering apparatus, comprising a receptacle having a liquid supply conduit connected thereto, a suction conduit connected to the receptacle, a valve controlling the suction conduit, a float means for actuating the valve, and means forming part of the connection between the float and the valve for positively preventing the movement of the valve until the receptacle has received its predetermined amount of liquid.

3. A liquid metering apparatus, comprising a receptacle having a liquid supply conduit connected thereto, a suction conduit connected to the receptacle, a valve controlling the suction conduit, an air inlet opening formed in the receptacle and a valve therefor, a float means for moving the valves, lever arms between the float means and the valves, and means carried by the arms for positively preventing movement of the valves until the receptacle has received its predetermined amount of liquid.

4. A liquid metering apparatus, comprising a receptacle having a liquid supply conduit connected thereto, a suction conduit connected to the receptacle, a valve controlling the suction conduit, an air inlet opening formed in the receptacle and a valve therefor, a float means for moving the valves, lever arms and a spring and a link between the float means and the valves, and a curved member carried by one of the arms and engaging another arm for positively preventing movement of the valves until the receptacle has received its predetermined amount of liquid.

5. A liquid metering apparatus, comprising a receptacle having a liquid supply conduit connected thereto, a suction conduit connected to the receptacle, a valve controlling the suction conduit, an air inlet opening formed in the receptacle and a valve therefor, a bell crank lever connected to the valves, lever arms connected together by a link, a spring connecting one of the lever arms to the bell crank lever and a float connected to the other lever arm, said last mentioned lever arm having a curved portion which is engaged by the bell crank lever to prevent the bell crank from moving the valves until the float reaches predetermined positions.

6. A liquid metering apparatus, comprising a receptacle having a liquid supply conduit connected thereto, a suction conduit connected to the receptacle, a valve controlling the suction conduit, an air inlet opening formed in the receptacle and a valve therefor, a bell crank lever connected to the valves, lever arms connected together by a link, a spring connecting one of the lever arms to the bell crank lever, and a float connected to the other lever arm, said last mentioned lever arm having a segmental flange which is alternately engaged on opposite sides by the bell crank lever to prevent the bell crank lever from moving the valves until the float reaches predetermined positions.

7. A liquid metering apparatus comprising a receptacle having a liquid supply conduit connected thereto, a suction conduit connected to the receptacle, a valve controlling the suction conduit, an air inlet opening formed in the receptacle and a valve therefor, a bell crank lever connected to the valves, lever arms connected together by a link, a spring connecting one of the lever arms to the bell crank lever, and a float connected to the other lever arm, said last mentioned lever arm having a segmental flange which is alternately engaged on opposite sides by a projecting portion of the bell crank lever, the said segmental flange being of such circumferential length with relation to the movement of the float as to positively prevent movement of the bell crank lever until the float has reached either end of its movement.

8. A liquid metering apparatus, comprising a receptacle having a liquid supply conduit connected thereto, a suction conduit connected to the receptacle, a valve controlling the suction conduit, an air inlet opening formed in the receptacle and a valve therefor, a bell crank lever connected to the valves, lever arms connected together by a link, a spring connecting one of the lever arms to the bell crank lever, and a float connected to the other lever arm, said last mentioned lever arm having a segmental side flange which is alternately engaged on opposite sides by a projection on the lower arm of the bell crank lever, said projection passing closely over the upper end of the flange when the float is in its lowermost position and closely under the lower end of the flange when the float is in its uppermost position, said flange positively preventing any movement of the bell crank lever while the float is in any intermediate position.

In testimony whereof, I affix my signature.

HERMON L. VAN VALKENBURG.